UNITED STATES PATENT OFFICE 2,578,938

DEIONIZATION OF SUGAR SOLUTIONS

Robert Kunin, Trenton, and Francis X. McGarvey, Haddon Heights, N. J., assignors to Rohm & Haas Company, Philadelphia, Pa., a corporation of Delaware No Drawing. Application June 15, 1950, Serial No. 168,381

4 Claims. (Cl. 127—46)

This application relates to improvements in the purification of sugar solutions by ion-exchange techniques. It is based upon the discovery that ionizable substances may be readily removed from sugar solutions with a minimum formation of invert sugars by bringing the sugar solutions into contact with a mixture of a strongly basic anion-exchange resin, the polar groups of which are primarily quaternary ammonium hydroxide groups, and a cation-exchange resin, the polar groups of which are primarily carboxylic acid groups.

In our copending application Serial No. 28,724, filed May 22, 1948, it is disclosed that mixtures of the known cation-exchange resins in the hydrogen form and anion-exchange resins formed by the attachment of quaternary ammonium hydroxide groups to a cross-linked polystyrene resin may be used in a mixed bed for the removal of ionizable materials from aqueous solutions, including sugar solutions, and that the mixtures may then be readily separated from each other and regenerated. By this mixed-bed technique of using ion-exchange materials the formation of an acidic condition in the solution being treated may be avoided. It is known that acidic conditions in a sugar solution cause inversion of the sucrose. The mixed bed technique by avoiding the formation of an acidic condition reduces this inversion. We have now found that inversion may be further reduced and even eliminated by using as the cation-exchanger in such mixed beds a cation-exchange resin the polar groups of which are carboxylic acid groups. We have further found that improved decolorizing of sugar solutions may be accomplished along with the removal of inorganic salts if the anion-exchanger used in such mixtures is a resin of the aforementioned class in which the degree of cross-linking is kept low. By this preferred combination, deashing and decolorizing are accomplished in a single operation under conditions which are not conducive to sucrose inversion.

The carboxylic cation-exchangers preferred are those of the type described in U. S. Patents Nos. 2,340,110 and 2,340,111. They are produced by the copolymerization of a polymerizable acid, such as acrylic or methacrylic acid, and a divinyl compound, such as divinyl benzene. In these products the divinyl compound serves to cross-link and insolubilize the linear chains of polymerized acids.

The strongly basic anion-exchangers which are preferred are those of the type described in copending applications of Charles McBurney, Serial No. 759,308, filed July 5, 1947, and Serial Nos. 96,133 and 96,134, filed May 28, 1949. These exchangers are produced by reacting a cross-linked polymeric monovinyl aromatic compound, such as styrene, with a chloromethylating agent so as to introduce chloromethyl groups as substituents on the aromatic rings of the polymer and then reacting the chloromethylated polymer with a tertiary amine. As more particularly described in Serial Nos. 96,133 and 96,134, the cross-linked polymer may be formed either by copolymerizing the monovinyl aromatic compound with a polyvinyl compound or by the introduction of methylene bridges between the aromatic rings of the polymeric monovinyl compound during the step of chloromethylating. The effect which the degree of cross-linking has upon the density, porosity, and exchange capacity of the final resin is likewise described in the later-filed applications. In the practice of the present invention those resins in which there is as much as 8% divinyl benzene in the polymer as cross-linking agent may be used for the removal of inorganic salts and some of the colored bodies. In the case of beet juice, resins having this degree of cross-linking are still quite effective in removing color but more efficient removal of color is accomplished if the exchangers which are used are more porous. Accordingly, we much prefer to use a resin having the porosity equivalent to that resulting from the use of from 0.5% to 2.0% divinyl benzene in the copolymer of styrene and divinyl benzene. These very porous resins, when used in the practice of the present invention, remove most of the color bodies from both raw cane sugar solutions and beet juice and produce clear sucrose solutions.

The following examples are given to illustrate the preparation of a satisfactory anion-exchange resin.

EXAMPLE 1

A. Into a one-liter, three-necked, balloon flask equipped with thermometer, mechanical stirrer, and reflux condenser was poured 400 ml. of water and 34 ml. of a 1.5% aqueous solution of magnesium silicate. Agitation was begun and a solution containing 97.5 g. of styrene, 1 g. of divinyl benzene, and 1.5 g. of ethyl styrene, with 1 g. of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, air-dried, and finally oven-dried for two hours at 125° C.

In a similar manner copolymers containing up to 10% of divinyl benzene may be prepared.

B. Fifty grams of the beads of copolymer prepared in part A above were placed in a one-liter, three-necked, balloon flask equipped with thermometer, mechanical stirrer, and reflux condenser. This amount corresponds to 0.5 mole of styrene in the form of a cross-linked copolymer. One hundred grams (1.25 moles) of chloromethyl ether, having the formula $$CH_3—O—CH_2Cl$$

was added and the mixture was allowed to stand at room temperature for 15 minutes during which time the beads of copolymer swelled. The mixture was then diluted with 115 ml. of petroleum ether (B. P. 30° C.–60° C.) and agitation was begun. The reaction mixture was cooled to 0° C. by means of an ice-salt bath and at this point 30 grams (0.23 mole) of anhydrous, powdered aluminum chloride was added in small portions over a period of one hour, after which the mixture was stirred at 0° C. for two hours. Then 500 ml. of ice-water was slowly added in order to decompose the excess of aluminum chloride and chloromethyl ether. The resultant mixture was stirred for 30 minutes and was filtered. The beads were first dried in air, then washed several times with water and finally dried in an oven at 125° C. for two hours.

The beads contained 21.97% chlorine by analysis.

C. In a 500 ml., three-necked, balloon flask, equipped with an agitator, reflux condenser, thermometer, and a gas-inlet tube, were placed 115 ml. of benzene and 50 grams of the chloromethylated beads prepared in part B above. Agitation was begun and the mixture was heated to refluxing temperature and held there for 30 minutes, during which time the beads swelled. The mixture was cooled to 20° C. and was saturated with anhydrous trimethylamine gas. The mixture was then heated to 50° C.–55° C. and held there for four hours while a steady stream of trimethylamine was passed therethrough. The mixture was then cooled to room temperature and allowed to stand overnight, after which the beads were filtered off, washed twice with benzene, and air-dried. The dried beads, free of benzene, were then mixed with a 10% aqueous solution of sulfuric acid for two hours, after which they were washed thoroughly with water and were finally converted to the form of the quaternary ammonium hydroxide by being stirred with a 15% aqueous solution of sodium hydroxide. The final product was washed with water until the wash-water no longer gave a pink color with phenolphthalein.

EXAMPLE 2

A. Into a five-liter, three-necked, balloon flask equipped with thermometer, mechanical stirrer, and reflux condenser was poured 1800 ml. of water which contained as dispersing agent 27 g. of a 20% solution of a copolymer of substantially equal parts of styrene and maleic acid dissolved in aqueous ammonia. Agitation was begun and a solution containing 10.8 g. of benzoyl peroxide dissolved in 1080 g. of styrene was added to the contents of the flask. The stirred mixture was then heated to 85° C.–90° C. and held there for four and one-half hours. The reaction mixture was cooled to room temperature by the addition of cold water, and the spheroids of polystyrene were separated from the liquid by decantation and filtration and then allowed to air-dry overnight.

The yield of polystyrene particles was quantitative. At this stage the polystyrene particles were fusible and soluble in all of the polystyrene solvents.

B. Forty-three grams of chloromethyl ether, having the formula $CH_3—O—CH_2Cl$, containing 13.12 g. (0.1 mole) of anhydrous, powdered aluminum chloride dissolved therein was poured into a one-liter, three-necked, balloon flask equipped with a thermometer, mechanical stirrer and reflux condenser. The flask and contents were cooled to 0° C. by means of an ice-salt bath and 100 ml. of petroleum ether (B. P. 30° C.–60° C.) was added. Agitation was begun and 25 g. of polystyrene particles prepared in part A above were added in small portions over a period of 30 minutes after which the cooling bath was removed. The reaction mixture was stirred for three hours at room temperature. Then the mixture was again cooled to 0° C. by means of an ice-salt bath and 125 ml. of ice-water was slowly added in order to decompose the excess of aluminum chloride and chloromethyl ether. The resultant mixture was stirred for one hour and was filtered. The beads were washed with water for two hours, filtered, and dried in an oven for two hours at 125° C.

At this stage the beads were infusible and insoluble in all of the common solvents for polystyrene. The beads contained 18.16 per cent chlorine by analysis.

C. In a one-liter, three-necked, balloon flask, equipped with a mechanical stirrer, reflux condenser, thermometer, and a gas-inlet tube, were placed 250 ml. of toluene and 30 grams of the chloromethylated beads prepared in part B above. This mixture was allowed to stand at room temperature for one hour, during which time the beads swelled. Agitation was begun and the mixture was cooled to 20° C. and saturated with anhydrous trimethylamine gas. The mixture was then allowed to come to room temperature and stirred for four hours. After this time agitation was stopped and the beads were removed by filtration. The toluene-wet beads were stirred for one hour in two 200 ml. portions of methanol in order to remove the last traces of toluene. The beads were removed by filtration, washed with water, and stirred with 500 ml. of 10% hydrochloric acid for two hours. (At this stage analysis of the beads showed that they contained 4.27% N and 10.97% Cl.) The acid-leached beads were washed thoroughly with water and were finally converted to the form of the quaternary ammonium hydroxide by being washed in a column with a 5–10% aqueous solution of sodium hydroxide until a positive chloride ion test could no longer be obtained. The final product was washed with water until the wash-water no longer gave a pink color with phenol phthalein.

The following example is given to illustrate the practice of the invention.

EXAMPLE 3

The exchange apparatus consisted of six beds, each containing a water-wet, intimate mixture of 375 cc. of cation-exchange resin and 1125 cc.

of anion-exchange resin. The cation-exchange resin was a copolymer of 95 parts of methacrylic acid and 5 parts of divinyl benzene prepared by the suspension polymerization technique and regenerated with 3% sulfuric acid. The anion-exchange resin was a product prepared as illustrated in Example 1 above and regenerated with 3% sodium hydroxide. After thorough rinsing and mixing of the resins a raw sugar solution was passed through the beds in series. The run was considered to have started when the effluent from the final bed reached 10° Brix. (The first portion of solution is of necessity diluted by the water originally present in the beds.) Thereafter samples were taken of the effluent from each bed at two-hour intervals and analyzed. The total effluent from the sixth bed for each two-hour period was likewise analyzed. Table I gives the analysis of the total effluent from the sixth bed for each two-hour period. In this table the column headed "Total solids" indicates the total grams of sugar solids that had passed through the beds, and "Percent transmission" means the per cent of light transmitted by the sugar solution compared to the light transmission of clear water and, of course, is a measure of color. The analyses for calcium, sodium, and potassium are in parts per million calculated as calcium carbonate.

TABLE I

*Composition of effluent from sixth bed collected at two-hour intervals*

| Sample | Brix | Total Solids | pH | Resistivity, 1,000 Ohms | Percent Transmission | Ca, P.P.M. | Na, P.P.M. | K, P.P.M. | Percent Invert |
|---|---|---|---|---|---|---|---|---|---|
| 0–2 hr | 54.9 | 3,690 | 8.6 | 120 | 93.7 | 0 | 10 | 0 | 2.28 |
| 2–4 hr | 59.6 | 8,300 | 8.5 | 180 | 92.3 | 0 | 10 | 0 | |
| 4–6 hr | 59.9 | 12,550 | 8.5 | 180 | 91.8 | 0 | 15 | 0 | |
| 6–8 hr | 60.3 | 16,690 | 8.5 | 240 | 90.6 | 0 | 15 | 0 | |
| 8–10 hr | 60.2 | 20,820 | 8.5 | 240 | 90.6 | 0 | 10 | 0 | |
| 10–12 hr | 60.2 | 25,690 | 8.5 | 150 | 90.0 | 0 | 25 | 0 | 2.74 |
| 12–14 hr | 60.3 | 30,560 | 8.9 | 39 | 89.7 | 0 | 260 | 0 | |
| Original | 60.2 | | 5.7 | 7.2 | 72.3 | 1,080 | 170 | 410 | 2.62 |

In Table II is given the analysis of the effluent from each bed at the end of twelve hours of operation.

TABLE II

*Composition of effluent from each bed at end of 12 hours*

| Bed | pH | Ca, P.P.M. | Na, P.P.M. | K, P.P.M. |
|---|---|---|---|---|
| 1 | 6.8 | 1,080 | 170 | 410 |
| 2 | 8.4 | 640 | 300 | 550 |
| 3 | 8.7 | 80 | 670 | 640 |
| 4 | 9.0 | 60 | 1,030 | 90 |
| 5 | 9.3 | 0 | 900 | 0 |
| 6 | 9.4 | 0 | 80 | 0 |
| Original | 5.7 | 1,080 | 170 | 410 |

From Table I is will be observed that after twelve hours of operation the two-hour cumulated effluent from the sixth bed was still of high quality but that the effluent collected during the next two hours, while free of calcium and potassium, contained more sodium than the original solution. It will also be observed that there was very substantial color removal and substantially no increase in invert sugar. The slight increase in the per cent of invert sugar shown in the table over the invert in the original sugar solution is due to the fact that invert sugar was adsorbed by the resin beds during the earlier stages and was later released as the resin became exhausted.

From Table II it will be observed that after twelve hours the cation-exchanger in the first bed was completely exhausted. The second and third beds were adsorbing calcium ions by exchanging sodium and potassium ions for the calcium ions. The fourth bed was exchanging sodium ions for potassium and calcium ions and the fifth and sixth beds, which were the least exhausted, were adsorbing sodium ions as well as calcium and potassium ions.

The pH of the samples of effluent taken from the different beds at the two-hour intervals is given in Table III.

TABLE III

*pH of effluent from each bed at two-hour intervals*

| Bed | 2 hrs. | 4 hrs. | 6 hrs. | 8 hrs. | 10 hrs. | 12 hrs. | 14 hrs. |
|---|---|---|---|---|---|---|---|
| 1 | 7.8 | 7.7 | 7.3 | 7.1 | 6.9 | 6.8 | 6.7 |
| 2 | 9.0 | 9.2 | 9.2 | 8.8 | 8.6 | 8.4 | 6.7 |
| 3 | 8.8 | 9.4 | 9.5 | 9.4 | 9.1 | 8.7 | 8.5 |
| 4 | 8.3 | 8.3 | 8.3 | 9.4 | 9.4 | 9.0 | 8.9 |
| 5 | 8.3 | 8.2 | 8.1 | 8.0 | 8.0 | 9.3 | 9.3 |
| 6 | 8.4 | 8.3 | 8.3 | 8.3 | 8.3 | 9.4 | 9.3 |

From these measurements it will be observed that as the sugar solution passes through the system its pH may vary from a maximum of about 9.5 to a minimum of about 8.3 but that the solution never becomes acidic.

In practice, a large number of beds as illustrated may be used, or a fewer number, or even a single bed can be used as desired. It is preferred to use at least two beds so that by rotating the order of the beds the resin may be more nearly exhausted before being taken off the line for regeneration. In the six-bed system illustrated the first bed, after it becomes completely exhausted, may be removed from the line for regeneration and a fresh bed added after the original sixth bed. Alternatively, beds 1 and 2 may be combined into a single bed, beds 3 and 4 combined into a second bed, and beds 5 and 6 combined into a third bed whereby a three-bed system is provided which may likewise be rotated in the exhaustion and regeneration cycles. A system of two mixed beds, or of four, or any other system having a plurality of mixed beds may be similarly operated.

After a bed becomes exhausted, the two resins must be separated from each other for regeneration. This separation may be accomplished in several ways, but we prefer the processes disclosed in our copending applications Serial No. 28,724, filed May 22, 1948, and Serial No. 115,973, filed September 16, 1949, now abandoned. In both of these applications processes are disclosed in which advantage is taken of the differences in specific gravity of the cation-exchange resin and the anion-exchange resin. In Serial No. 28,724 it is shown that, by passing water or other suitable liquid upwards through a mixed bed of ion-exchange resins in which the anion-exchange resin is of the type illustrated in Example 1, the anion-exchanger because of its relatively very low specific gravity may be washed out of the column without removal of the cation-exchanger. In Serial No. 115,973 a process is disclosed in which the mixture of resins is similarly separated by passing water or other liquid upward through the bed but instead of washing the anion-exchanger out of the column the resins are merely stratified into two layers which may, for example, be regenerated first by passing alkali downward through both layers whereby the anion-exchanger is regenerated and then by passing acid downward through the lower layer only, whereby the cation-exchanger is regenerated. Either of these methods may be utilized for the separation and regeneration of the resins used in the practice of this invention. Good separation is accomplished using an upward flow of water equal to about five gallons per square foot of bed cross-section per minute.

In processes of deionizing sucrose solutions heretofore proposed, it has been necessary to cool the hot sugar solutions prior to treatment with ion-exchanger in order to prevent substantial inversion. Such cooling is not required in practicing the present invention. Measurement of the rate of inversion when sugar solutions are in contact with various ion-exchange materials has shown that the rate of inversion at 100° C. when the sugar solution is in contact with the combination of resins herein shown is decidedly lower than the rate of inversion at 50° C. when a mixture of quaternary ammonium anion-exchanger and sulfonic acid cation-exchanger is used, even though the pH of the two sugar solutions was at the neutral point.

In the foregoing Example 3 the application of the invention to solutions of raw cane sugar is illustrated, but in an exactly similar manner it may be applied to solutions that occur at other stages of the refining of beet and cane sugar. It is applicable particularly to raw sugar juices that have been clarified as, for instance, by treatment with lime with or without carbonation, sulfitation or treatment with phosphoric acid, and to affination syrups and the sweet waters obtained during refining. It may also be applied to the mother liquor obtained from massecuites after separation of crystals and even to the final molasses but preferably it should be utilized prior to the solution entering the first evaporator as the removal of salts from the solution avoids scaling of the evaporator. It may also be combined with other deionization processes and particularly the process of removing ash described in copending applications of James C. Winters and Robert Kunin, Serial No. 20,847, filed April 13, 1948 now Pat. No. 2,551,519. When so combined the sugar solution is given a first treatment with a carboxylic acid ion-exchange resin of the type described in U. S. Patents Nos. 2,340,110 and 2,340,111 whereby up to one-half the ash is removed and then a mixed bed treatment as herein-described.

We claim:

1. The process of removing ionizable impurities from a sugar solution which comprises passing the solution through a mixed bed of an anion-exchange resin and a cation-exchange resin, the anion-exchange resin being one the polar groups of which are primarily quaternary ammonium hydroxide groups and the cation-exchange resin being one the polar groups of which are primarily carboxylic acid groups.

2. The process of claim 1 wherein the anion-exchange resin is a cross-linked polymer of an aromatic vinyl compound having the quaternary ammonium hydroxide groups linked to the aromatic rings through methylene groups and wherein the cation-exchange resin is a copolymer of a polymerizable carboxylic acid and a divinyl compound.

3. The process of removing ionizable impurities from a sugar solution which comprises passing the solution through a mixed bed of an anion-exchange resin and a cation-exchange resin, the anion-exchange resin being a copolymer of styrene and divinyl benzene having quaternary ammonium hydroxide groups linked to the aromatic rings through methylene groups, and the cation-exchange resin being a copolymer of divinyl benzene and an acid of the group consisting of acrylic and methacrylic acids.

4. The process of claim 3 wherein the copolymer of the anion-exchange resin contains from 0.5% to 2% divinyl benzene as the cross-linking component.

ROBERT KUNIN.
FRANCIS X. McGARVEY.

REFERENCES CITED

The following references are of record in the file of this patent:

UNITED STATES PATENTS

| Number | Name | Date |
|---|---|---|
| 2,461,505 | Daniel | Feb. 15, 1949 |
| 2,461,506 | Daniel | Feb. 15, 1949 |

OTHER REFERENCES

Ser. No. 359,575, Smit (A. P. C.), published May 11, 1943.